March 31, 1936.  L. V. LUCIA  2,036,178
AUTOMATIC REGULATING MEANS FOR VARIABLE TIME CONTROLS
Filed Jan. 12, 1931  2 Sheets-Sheet 1
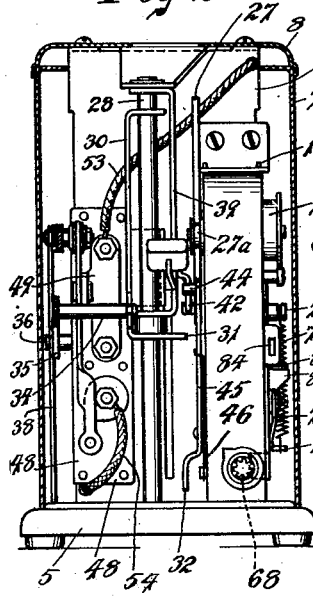
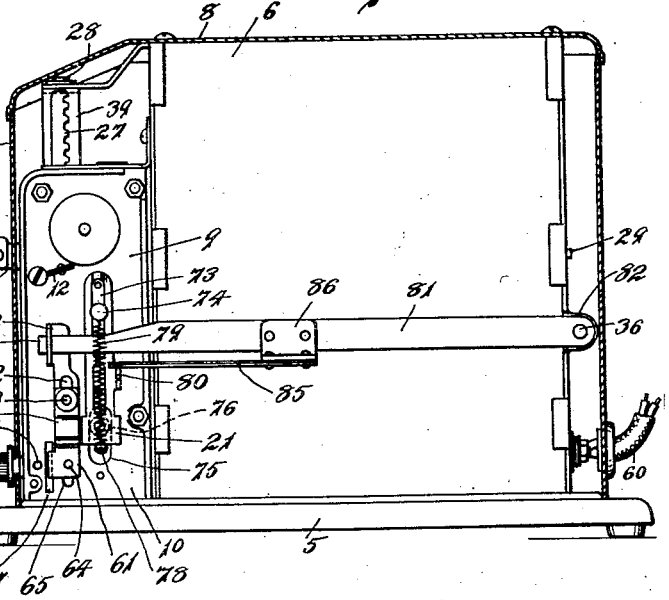
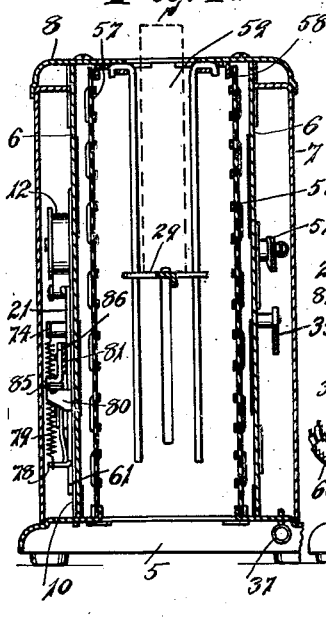
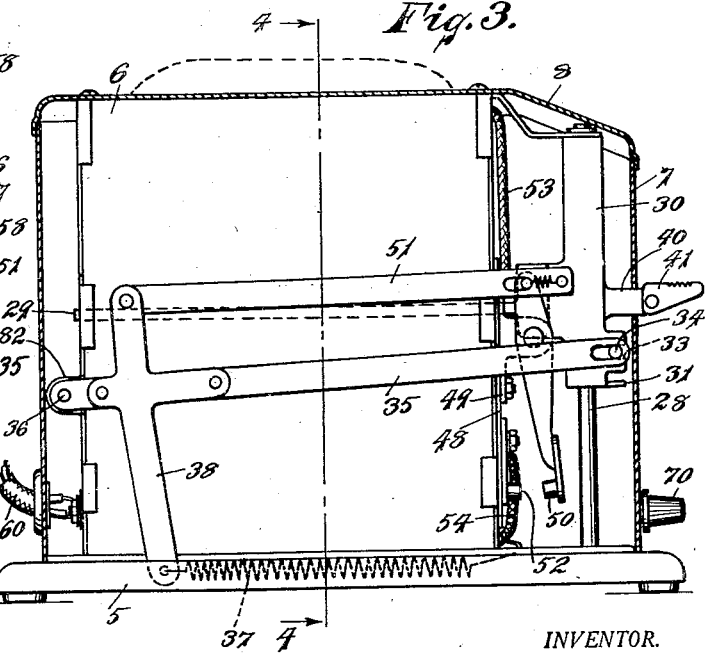
INVENTOR.
Louis V. Lucia March 31, 1936.  L. V. LUCIA  2,036,178
AUTOMATIC REGULATING MEANS FOR VARIABLE TIME CONTROLS
Filed Jan. 12, 1931  2 Sheets-Sheet 2
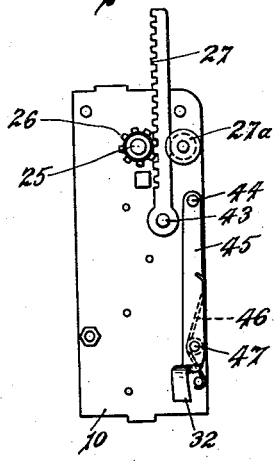
Fig. 5.
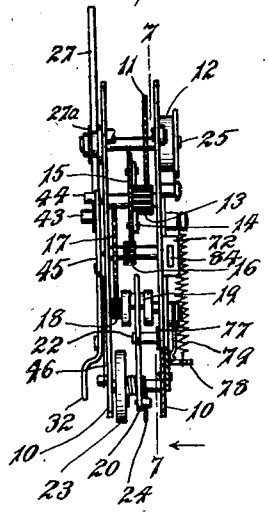
Fig. 6.
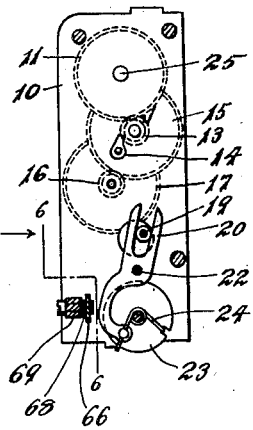
Fig. 7.
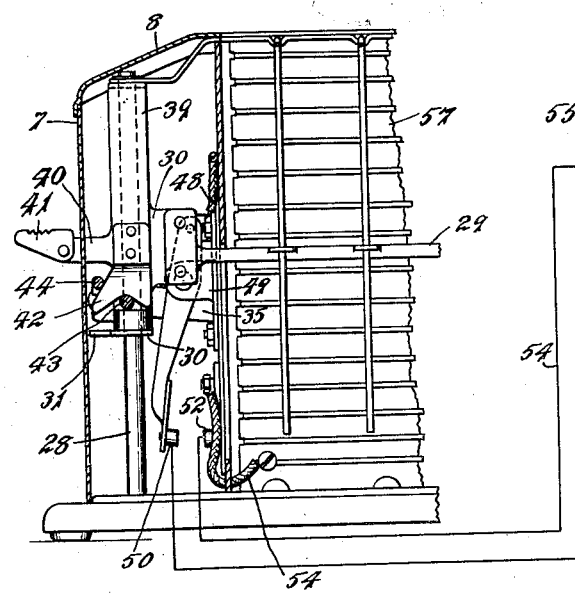
Fig. 8.
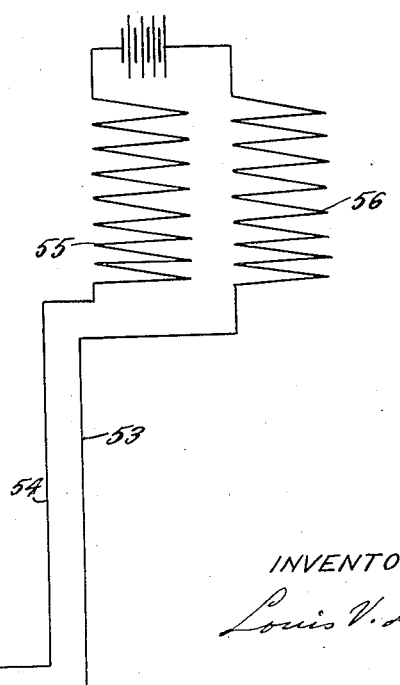
INVENTOR:
Louis V. Lucia Patented Mar. 31, 1936

2,036,178

UNITED STATES PATENT OFFICE 2,036,178

AUTOMATIC REGULATING MEANS FOR VARIABLE TIME CONTROLS

Louis V. Lucia, Rome, N. Y., assignor, by mesne assignments, to McGraw Electric Company, Chicago, Ill., a corporation of Delaware Application January 12, 1931, Serial No. 508,340

25 Claims. (Cl. 219—19)

My invention relates to that class of electrical cooking devices in which the operation is controlled by means of a timing mechanism.

It is well known among those skilled in the art that so called automatic cooking devices such as toasters, waffle irons and the like which are controlled by timing mechanisms, are not entirely satisfactory due to the fact that the results are greatly affected by the temperature of the device itself.

In some devices of this kind the timing mechanism is employed to shut off the heat. In others the timing mechanism is employed to open the device or eject the contents while in others both of the above operations are performed by said time mechanism.

In the case of automatic toasters such as I have illustrated in the accompanying drawings, the timing mechanism serves to both shut off the heat and eject the slice of bread which is being toasted. The operation is performed at a predetermined time.

As now commonly constructed the degree to which the bread is toasted is regulated by a time adjustment which will increase or decrease the length of time permitted for the operation by the timing mechanism. Once the proper adjustment is found for the results desired, it is intended that it should not be disturbed.

If the device is cold, however, as in the first operation it will require more time to toast properly than it will after a few operations when the device has become heated.

It can be clearly seen, therefore, that the results obtained cannot be kept perfectly uniform.

An object of my invention is to provide means whereby the time period at each operation of that device is automatically operated to correspond with the temperature of the said device.

A further object of my invention is to provide means whereby the said timing mechanism may be manually adjusted to obtain the desired results and automatic means whereby the said results may be kept uniform at each operation of the device regardless of the temperature of the same.

These objects are obtained by the mechanism which I have illustrated in the accompanying drawings in which Fig. 1 is a side view of an automatic electric toaster with the side wall thereof removed to shows the construction of my time controlling means.

Fig. 2 is a front view of the device with the front wall thereof broken away to disclose the operating mechanism.

Fig. 3 is a view of the device with the side wall thereof broken away and showing the side opposite to that of Fig. 1.

Fig. 4 is a view in cross section on line 4—4 of Fig. 3.

Fig. 5 is a side view of the timing device.

Fig. 6 is a front view of the same with the cover removed and the side wall being broken on line 6—6 of Fig. 7.

Fig. 7 is a view in cross section on line 7—7 of Fig. 6.

Fig. 8 is a view of the front part of the device on a line near the center of the same, some of the parts being omitted for the purpose of clearness. The heating elements are shown diagrammatically in connection with this view.

Similar numbers refer to similar parts throughout the several views.

The numeral 5 denotes a base on which is mounted a heating chamber enclosed within the inner walls 6. An outside housing is provided by means of the outer walls 7 and top 8 which housing is also mounted on the base 5 and encloses the operating mechanism.

A timing device 9 of a suitable type is mounted within the outer housing in co-operative relation with the toaster operating mechanism as clearly shown in Fig. 2.

In this type of timing devices the time interval is determined by the speed at which the mechanism is allowed to operate.

As shown clearly in Figs. 5, 6 and 7 this mechanism consists of a frame which is composed of sides 10 on which is mounted a gear 11 that is rotated by a spring 12 mounted on the outside of the frame.

This gear 11 meshes with a pinion 13 and through pawls 14, gear 15, pinion 16, gear 17 and pinion 18 turns the crank 19. A speed regulating rocking lever 20 is rotatably mounted on the slide bar 21 by means of a stud pin 22. The upper end of the lever 20 is slotted to engage the crank 19 and the lower end of said lever is rotatably and slidably mounted to the balance wheel 23 by means of a spring 24.

It can be readily seen that if the lever 20 is moved upwardly by means of the slide bar 21 the fulcrum point of the lever is brought nearer to that of the crank 19 and the lower operating end of the lever is brought nearer to the balance wheel 23 thus reducing the leverage at both points. This will increase the force required from the crank 19 to rock the lever 20 and give a reciprocating motion to the balance wheel and thus cause a slowing down of the rotating crank which in turn slows down the operation of the entire timing mechanism.

If the lever 20 is moved downwardly, the leverage at the two fulcrum points would be increased thus reducing the force required to rock the lever 20 and causing the crank 19 to rotate faster and the entire timing mechanism to operate at a faster speed.

The gear 11 and spring 12 are mounted on the shaft 25 which has a pinion 26 mounted at the other end thereof. A rack 27 engages this pinion and is held in engagement therewith by means of the sheath 27a.

In the operation of the timing mechanism the rack 27 is pulled downwardly turning the pinion 26 and thus winding the spring 12. The time required for the rack to return to its original position completes the cooking operation of the device.

This interval of time may be fast or slow, depending on the position of the lever 20 with relation to the crank 19.

The toaster mechanism is composed of a vertical post 28 on which is slidably mounted a bread carrier bracket by means of a slide 30. A detent 31 extends from the bottom portion of the slide 30 in position to engage the pawl 32 mounted on the timing mechanism frame. The slide 30 also contains a notch 33 (see Fig. 3) within which is engaged a stud 34 mounted on the lever 35 which is pivoted at its other end on a pin 36 mounted to brackets on the wall 6.

This lever 35 is biased and actuated by means of a spring 37 which pulls on a lateral extension 38 mounted thereon. The other end of the said spring is connected to the base 5.

A slide 39 is also mounted on the post 28 and has an extension 40 projecting through the outer housing 7 and a finger piece 41 is mounted to the said extension.

An actuator bracket 42 is secured to the slide 39 and is positioned to engage the stud 43 on the rack 27 and the stud 44 on the pawl lever 45 which lever is forced toward the bracket 42 by means of a spring 46. The said lever is pivotally mounted to the frame of the timing device by means of the stud 47.

A circuit breaker is mounted in connection with the toaster mechanism and includes a plate of insulating material 48 mounted on the housing 6.

A breaker arm is mounted on the plate 48 by means of the bracket 49 and has at its breaker end a contact 50. The arm is operated by means of the connecting bar 51 which is operated by a connection with the lever 35. A second contact 52 is also mounted on the plate 48.

An electric circuit wire 53 is connected to the breaker arm and another circuit wire 54 is connected to the contact 52. These wires are each connected to the ends of the resistance coils 55 and 56 and complete an electrical circuit on the elements 57 and 58 which are mounted within the toasting chamber 59 and connected to a flexible electrical conductor 60.

While I have described the foregoing operating mechanism I wish to have it understood that it comprises simply one form of mechanism which can be automatically controlled by my invention.

That part of the device illustrated which comprises my invention will now be described and is illustrated clearly in Fig. 1. It is composed of a manually adjustable slide 61 slidably mounted to the frame 9 of the timing device. This slide has a slot 62 through which projects a post 63, and a guide pin 64 mounted to said slide engages a slot 65 in the frame 9. Both the post 63 and the pin 64 serve to guide the slide 61 for travel in a vertical direction.

At one side of the slide 61 is formed a rack portion 66 which projects in the slot 69 and engages an adjusting pinion 68 that is mounted on a bearing stud 69.

An adjusting knob 70 is attached to said pinion 68 in locked relation thereto and serves as a means to manually rotate the said pinion in order to move the slide 61 up or down.

This slide is frictionally held in position by means of a friction spring 71. At the upper portion of the slide is formed an ear 72 which has an aperture 84 to receive a bar which is hereinafter described.

The slide 21 is also slidably mounted on the frame 9 of the timing device and is located adjacent to the slide 61. The said slide 21 has a slot 73 therein to receive a stud 74 by means of which the said slide is mounted to the frame.

The rocking lever stud pin 22 is mounted at the lower end of the slide 21 and the said pin extends through the slot 75 in the frame 9. An enlarged portion 76 on said pin fits for sliding motion within said slot and has a flange 77 on the opposite side of the frame. Both the said pin 22 and stud 74 serve to mount the said slide 21 to said frame for vertical sliding motion.

An outwardly extending finger 78 is formed from the lower end of said slide 21 and a spring 79 is connected between the said finger and the stud 74 to pull the slide 21 in an upwardly direction. The said slide 21 also has an extension 80 formed therefrom at one side thereof as clearly illustrated.

A bar 81 is pivotally mounted at one end of the bar 36 which extends through from the opposite side of the housing 6 and is supported thereon by means of the ears 82 extending outwardly from the end of said housing.

The opposite side of the bar 81 is reduced as at 83 and extends through the aperature 84 in the ear 72 of the slide 61.

A bi-metallic member 85 is mounted on said bar 81 by means of a bracket 86 as clearly illustrated. The said bi-metallic member is so mounted that when heated it will flex in a downwardly direction against the extension 80 of the slide 21 tending to move said slide downwardly against the tension of the spring 79.

The operation of my invention is as follows:

Assume first that it is desired to adjust the timing mechanism so that a darker slice of toast can be obtained. The knob 70 is turned to the left. This will rotate the pinion 68 which meshes with the rack 66 on the slide 61 and causes said slide to move upwardly being frictionally held in set position by means of the spring 71.

The upward movement of the slide 61 will also raise the bar 81 and bi-metallic member 85. When the said member is thus raised the slide 21 is also raised by means of the spring 79. This slide which carries the lever 20 will raise the same, decreasing the leverage between its fulcrum at 22 and the crank 19 thus causing a slower operation of the timing mechanism, which will provide a longer period of time for the toasting operation so that the toast will be darker as desired.

If a lighter slice of toast is desired the knob 70 is rotated to the right causing the slide 21 to be moved downwardly by the bimetallic member 85 against the tension of the spring 79. This will cause the lever 20 to be moved downwardly so that the leverage above described is increased causing the crank 19 to rotate faster and thus reduce the period of time for the toasting operation so that the toast will be lighter as desired.

After the mechanism has been adjusted as above described and the desired results are obtained it will not be necessary to disturb the adjustment as the friction spring 71 will hold the slide 61 in fixed position against the frame 9.

Assuming that the mechanism has been properly adjusted and it is desired to toast a number of slices of bread, the mechanism above described will operate as follows:

A slice of bread is inserted into the heating chamber 59 between the element guard wires therein and on the bread carrier 29.

The finger piece 41 is now pressed downwardly as far as it will go. This operation will force the slide 39 to move downward upon the post 28, the said slide also pushing down the slide 30. As the slide 39 moves downwardly, the bracket 42, which is mounted on said slide engages the pin 43 of the rack 27 and pulls down said rack which turns the pinion 26 thus winding the spring 12 by a backward rotation that is made possible by means of the pawls 14 on the gear 15.

The downward travel of the slide 30 which carries the bread carrier 29 will cause the bread upon said carrier to be carried down into the heating chamber and at the same time the said slide will force the lever 35 to swing downwardly upon its pivot at 36 against the tension of the spring 37.

This motion of the lever 35 will in turn move the bar 51 forwardly swinging the breaker arm and causing the contact 50 to touch the contact 52 which will close the electrical circuit through the element resistances 55 and 56 on the elements 57 and 58. This will cause said elements to supply the heat for toasting the bread therebetween.

When the slides 39 and 30 have moved to their lowermost position on the post 28, the detent 31 slides past the pawl 32 which engages the same.

The pressure upon the finger piece 41 is now released. The spring 12 will begin to unwind causing the operation of the timing mechanism as herebefore described. This operation of the timing mechanism will rotate the pinion 26 forwardly gradually raising the rack 27 as the spring 12 unwinds. The speed at which the said spring unwinds is governed by the position in which the rocking lever has been set as hereinbefore described with respect to the crank 19 and the balance wheel 23.

As the rack 27 moves upwardly, it also lifts the slide 39 and finger piece 41 by means of the pin 43 thereon engaging the bracket 42 on said slide.

While the timing mechanism is moving the said slide 39 upwardly, the pawl 32 is retaining the slide 30 against the tension of the spring 37. This maintains the bread carrier in its lowest position and the circuit breaker in its closed position causing the bread on said carrier to become toasted.

As the slide 39 reaches the limits of its upward travel, the angularly disposed front edge of the bracket 42 engages the pin 44 on the pawl lever 45 moving the same forwardly and causing the pawl 32 to disengage the slide 30. This will then be quickly raised by means of the spring 37, breaking the electrical circuit and raising the bread carrier and toast to their original position as shown in the drawings, this completing the toasting operation.

While each toasting operation is taking place some of the heat is naturally absorbed by the device itself which in a short time becomes very hot. It can be readily understood that when the device is hot it will require less time to toast than it does when cold. In order to obtain uniform results as the device becomes heated, it would be necessary to adjust the timing mechanism for each slice of toast. As this cannot be done with any degree of accuracy, it is not intended that the time adjustment should be disturbed once it has been set. It, therefore, becomes necessary to set the timing so that the desired results will be obtained when the device has become reasonably warm.

With the timing adjusted for a warm toaster it is evident that if a slice of bread was inserted on the first operation when the device is cold, it would not toast as a much longer time is required. Makers of the devices, therefore, instruct the users to operate them for the first operation without inserting a slice of bread so as to give the device an opportunity to become preheated. However, this precaution is not sufficient for the device continues to rise in temperature at each successive toasting operation until about the fourth or fifth operation it has become so hot that the toast will be burnt more and more at each operation as the device becomes hotter.

It is for the purpose of eliminating this difficulty that my invention will be found very effective.

In a device embodying my invention as illustrated, the timing adjustment can be permanently set to obtain the desired results at each operation regardless of the temperature of the device.

The first slice of bread can be toasted in the first operation in spite of the fact that the device is cold when the said operation is started.

The operation of that part of the mechanism involving my invention will now be described.

When the first slice of bread is inserted into the cooking chamber, the device being cold, the timing device will operate at the slowest speed which is permitted by the adjustment that has been made.

As the device begins to heat, the bi-metallic strip 85 begins to flex in a downwardly direction, forcing the slide downwardly and consequently increasing the speed of the timing mechanism and reducing the time interval for the operation in proportion to the temperature of the device.

In can be readily seen, therefore, that the more the device rises in temperature the more the bi-metallic strip 85 will flex in a downwardly direction. This moves the slide 21 further and consequently increases the speed of the timing mechanism as hereinbefore described. This operation of the bi-metallic strip will thus serve to regulate the timing mechanism so that the time interval for each operation will correspond with the temperature of the device and the speed at which the same will toast under the existing temperature thus insuring uniformity of results.

It is to be understood that if a darker toast is desired the knob 70 is turned to the left causing the slide 21 to move up by means of its spring contact with the bi-metallic strip 85. If a lighter toast is desired the knob is turned to the right causing the slide to be moved down. The speed of the timing device at each operation will then be faster or slower in accordance with the setting but always corresponding to the temperature of the device.

While I have shown and described one type of device and timing mechanism, I wish to have it understood that my invention can be used on different types of devices and timing mechanisms than are herein described. My invention can also be modified to a greater or lesser extent and still be within the scope of the same as covered by the following claims.

I claim as my invention:—

1. A device of the class described including an electric heater and a switch for controlling the current to said heater, a clock mechanism for operating said switch, said clock mechanism comprising a speed controlling member for controlling the speed of said clock mechanism, means for adjusting said speed controlling member comprising a movable member, and a thermostatic member in engagement with said movable member for thermally controlling the speed of said clock mechanism.

2. A device of the class described including an electric heater, a switch for controlling the current to said heater, a detent for holding the switch closed, a clock mechanism, a movable element connected for winding the clock mechanism and engageable with the detent at the end of a timing period, speed controlling means for controlling the speed of said clock mechanism, means for manually adjusting said speed controlling means, a pivoted member operated by said manual adjusting means, a sliding bar for adjusting the said speed controlling member, and a thermally operated member movable with said pivoted member and in engagement with said adjusting bar for actuating the same by the heat of said heater.

3. A device of the class described including an electric heater, a switch for controlling the current to said heater, a detent for holding the switch closed, a clock mechanism, a movable element connected for winding the clock mechanism and adapted to be entrained when the clock is running for engagement with the detent at the end of a timing period, a speed controlling means for controlling the speed of said clock mechanism, means for mechanically adjusting said speed controlling means, a supporting member, a thermostatic element mounted on said supporting member and in engagement with said adjusting means for thermally adjusting said speed controlling means, and manually operated means for adjusting said supporting member.

4. A device of the class described including a toasting chamber, an electric heater therefor, a bread support movable respectively to set the bread in and withdraw it from the toasting position with respect to the heater, a detent for holding the bread support in advanced position, a clock mechanism, a movable element connected for winding the clock mechanism and engageable for releasing the detent and thereby cause withdrawal of the bread support at the end of a timing period, means for regulating the speed of said clock mechanism, and thermally operated means for adjusting said means.

5. A device of the class described, comprising a heater, a clock, a switch mechanism including a detent, a movable element for winding the clock and adapted to be moved by said clock for tripping said detent to operate said switch mechanism, means for controlling the speed of said clock, thermally operated means for adjusting said speed controlling means, and means for manually adjusting said thermally operated means.

6. A device of the class described including a toasting chamber, an electric heater therefor, a clock operated bread support movable respectively to advance the bread and to withdraw it from toasting position with reference to the heater, a detent for holding the bread in advanced position, and a movable element connected for winding the clock and engageable to release the detent and, therefore, cause withdrawal of the bread support at the end of a timing period, a speed controlling mechanism for controlling the speed of said clock, adjusting means for said speed controlling mechanism, a thermostatic element controlled by the heater temperature for actuating said adjusting means, and means for manually adjusting said thermostatic element.

7. A device of the class described including a toasting chamber and an electric heater therefor, a bread support movable respectively to advance the bread to and withdraw it from toasting position with reference to the heater, an electric switch for said heater, a detent for holding the bread support in advanced position and the switch in a closed position, a clock mechanism, a movable element operated by said clock mechanism and engageable to release the detent and thereby cause the withdrawal of the bread support and opening of the electric switch at the end of a timing period, speed controlling means for said clock mechanism, a member operatable for adjusting said speed controlling means, and a thermostatic element operated by the heat of said heater for thermally operating said member.

8. A device of the class described including a toasting chamber and an electric heater therefor, a bread support movable respectively to advance the bread to and withdraw it from toasting position with reference to the heater, an electric switch for said heater, a detent for holding the bread support in advanced position and the switch in a closed position, a clock mechanism, a movable element operated by said clock mechanism and engageable to release the detent and thereby cause the withdrawal of the bread support and opening of the electric switch at the end of a timing period, speed controlling means for said clock mechanism, a member operatable for adjusting said speed controlling means, a thermostatic element operated by the heat of said heater for thermally operating said member, and means for selectively adjusting said member and said thermostatic element simultaneously.

9. A device of the class described including a cooking chamber and an electric heater therefor, a means for supporting material to be cooked within said chamber, means for ejecting said material therefrom, a detent for holding said ejecting means in locked position, a clock mechanism, a movable element operated by said clock mechanism and engageable to release the said detent and thereby cause ejection of said material, a speed controlling device for said clock mechanism, a member for adjusting the said speed controlling mechanism, and a thermostatic element operated by the heat of said heater for operating said member.

10. A device of the class described including a cooking chamber and an electric heater therefor, means for supporting material to be cooked within said chamber, means for ejecting said material therefrom, a detent for holding said ejecting means in locked position, a clock mechanism, a movable element operated by said clock mechanism and engageable to release the said detent and, therefore, cause ejection of said material, a speed controlling device for said clock mechanism, a member for adjusting the said speed controlling mechanism, a thermostatic element operated by the heat of said heater for operating said member, and means for manually adjusting said thermostatic element and said member simultaneously.

11. A device of the class described comprising a cooking chamber and a heater therefor, means for ejecting material to be cooked therein from said heater, an electric switch for said heater, a detent for holding the said ejecting means and electric switch in locked position, a clock mechanism, a movable element operated by said clock mechanism for releasing said ejecting mechanism and electric switch, a variable speed mechanism for controlling the speed of said clock, adjusting means for said variable speed mechanism, and a thermostatic member operated by the heat of said cooking device for thermally operating said adjusting means.

12. A device of the class described comprising a cooking chamber and a heater therefor, means for ejecting material to be cooked therein from said heater, an electric switch for said heater, a detent for holding the said ejecting means and electric switch in locked position, a clock mechanism, a movable element operated by said clock mechanism for releasing said ejecting mechanism and electric switch, a variable speed mechanism for controlling the speed of said clock, adjusting means for said variable speed mechanism, a thermostatic element operated by the heat of said cooking chamber for thermally operating said adjusting means, and single means for manually adjusting said variable speed mechanism and said thermostatic member.

13. A device of the class described including a heater, a clock mechanism for controlling the operation thereof, said clock mechanism comprising an adjustable variable speed regulator for varying the speed thereof, a slidable adjusting bar for adjusting said speed regulator, and a thermostatic element operated by the heat of said heater for thermally operating said adjusting bar.

14. A device of the class described including a heater, a clock mechanism for controlling the operation thereof, said clock mechanism comprising an adjustable variable speed regulator for varying the speed thereof and a slidable adjusting bar for adjusting said speed regulator, a thermostatic element operated by the heat of said heater for thermally operating said adjusting bar, and means for manually adjusting said speed regulator and for adjusting said thermostatic element relatively thereto.

15. A device of the class described including a heater, a clock mechanism for controlling the operation thereof, said clock mechanism comprising variable speed regulator therefor, a sliding member adapted to adjust said speed regulator, a pivoted bar, a thermostatic element mounted on said bar and adapted to thermally operate said sliding member by the heat of said heater in one direction, and means for moving said sliding member in the opposite direction.

16. A device of the class described including a heater, a clock mechanism for controlling the operation thereof, said clock mechanism including a variable speed regulator therefor, a sliding member adapted to adjust said speed regulator, a pivoted bar, a thermostatic element mounted on said bar and adapted to thermally operate said sliding member by the heat of said heater in one direction, means for moving said sliding member in the opposite direction, means for manually adjusting said pivoted bar, said means comprising a sliding bar for positioning said pivoted bar, a rack on said bar, a turnable knob, a pinion on said knob in engagement with said rack for moving said sliding bar, and resilient means for retaining said sliding bar in fixed position.

17. In a device of the class described, heating means, a regulator therefor, and a thermally responsive variable speed clock mechanism for controlling the operation of the regulator, said variable speed mechanism varying its speed in accordance with changes in the temperature to which it is responsive.

18. In a device of the class described, an electric heater, a control switch therefor, a variable speed clock mechanism for operating the switch, a member for regulating the speed of the clock mechanism, and thermostatic means associated with the speed regulating member for thermally controlling the operation of the clock mechanism.

19. In a device of the class described, a heater, a regulator therefor, a variable speed clock mechanism for controlling the operating of the regulator, and means for regulating the speed of the clock mechanism including an element responsive to temperature changes in the heater, thereby to thermally control the operation of the clock mechanism.

20. In combination with a heating chamber, electric heating elements therefor including an electric switch, a variable speed clock mechanism for controlling the operation of the switch, and means for automatically regulating the speed of the clock mechanism including a thermostat which is subject to variations in the temperature of the heating chamber.

21. In combination with a heating chamber, electric heating elements therefor including an electric switch, a variable speed clock mechanism for controlling the operation of the switch, means for regulating the speed of the clock mechanism, and a thermostat operatively associated with the regulating means and responsive to variations in the temperature of the heating chamber, thereby to actuate the regulating means and thermally control the operation of the clock mechanism.

22. In an automatic bread toaster, heating means, means for supporting a bread slice being toasted by said heating means, a thermostat responsive to the heat given off by the heating means, a variable speed clock, means connecting the thermostat and variable speed clock for regulating the speed of the latter in accordance with temperature fluctuations of the former, and means associated with said variable speed clock for terminating the toasting of the bread slice.

23. In an automatic bread toaster, heating means, means for supporting a bread slice being toasted by said heating means, a thermally responsive variable speed timing device which increases its speed of operation with increases in the temperature to which it is responsive, and controllable means for terminating the toasting of the bread slice, said last named means being under the control of the variable speed timing device.

24. In an automatic bread toaster, heating means, means for supporting a bread slice being toasted by said heating means, a thermally responsive variable speed timing device which increases its speed of operation with increases in the temperature to which it is responsive, a member propelled in a fixed path of travel by said timing device, and means for terminating the toasting of the bread slice whenever said member reaches a fixed point in its path of travel, irrespective of the temperature to which the timing device responds.

25. In an automatic bread toaster, heating means, means for supporting a bread slice being toasted by said heating means, a thermostat responsive to the heat given off by the heating means, a variable speed clock, means connecting the thermostat and variable speed clock for regulating the speed of the latter in accordance with temperature fluctuations of the former, means associated with said variable speed clock for terminating the toasting of the bread slice, and means for manually regulating the operation of said variable speed clock independently of said thermostat.

LOUIS V. LUCIA.